United States Patent Office 3,414,401
Patented Dec. 3, 1968

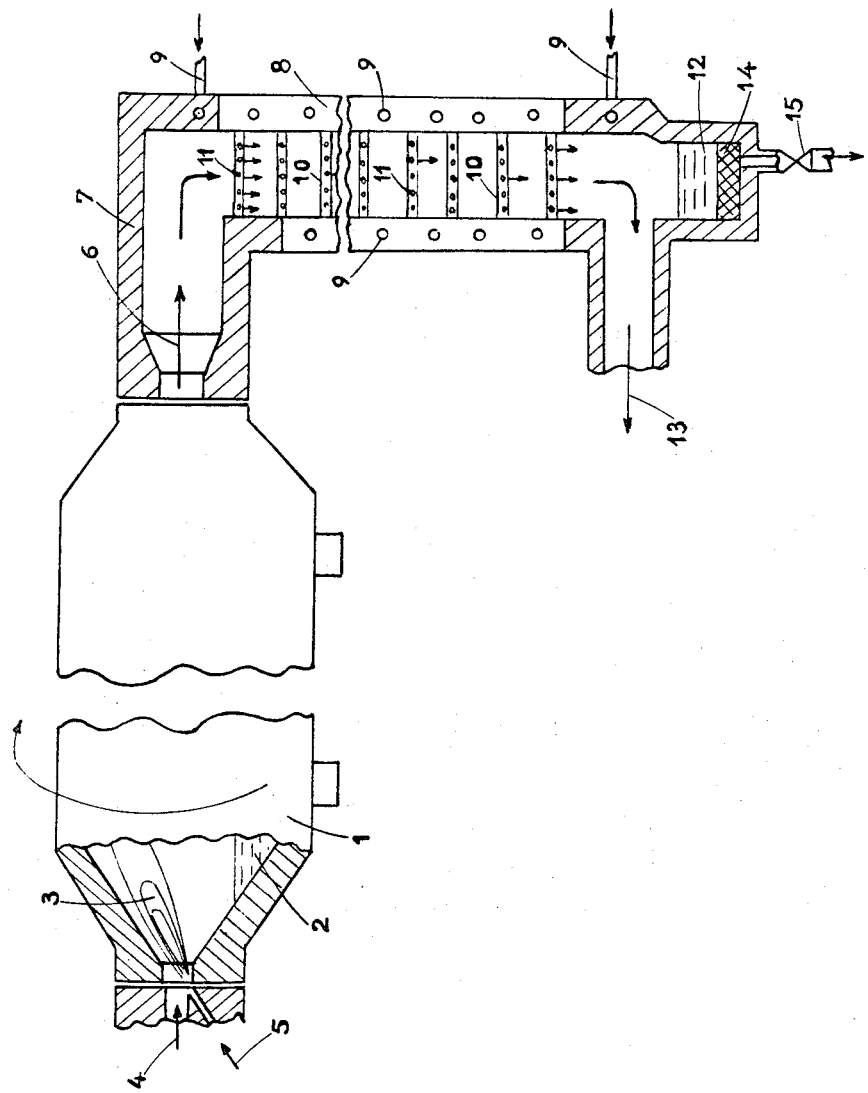

3,414,401
PROCESS FOR OBTAINING SOLID ZINC FROM ZINC VAPOUR CONTAINING GASES
Pierre Marie Fourt, Saint-Cloud, France, assignor to Societe Metallurgique d'Imphy, Paris, France, a company of France
Filed Mar. 8, 1966, Ser. No. 532,720
Claims priority, application France, Mar. 11, 1965, 8,865
2 Claims. (Cl. 75—25)

ABSTRACT OF THE DISCLOSURE

Zinc oxide is directly reduced in a rotating furnace heated by a flame burning in the presence of added industrial oxygen and the zinc containing vapours from the furnace are cooled in one or more hoods having substantially vertical axes and cooled walls with water injected into the vapours and recovered together with the metallic zinc at the base of the hoods.

---

The invention concerns the recovery of zinc existing as a vapour in the smoke emanating from a plant for the direct reduction of zinc oxide, usually from roasted concentrates of zinc.

It relates to obtaining solid zinc from smoke emanating from the reducing plant described in the French Patent No. 1,411,035 entitled "Plant and Process for the Reduction of Oxides which are Difficult to Reduce" filed on Apr. 30, 1964, by the Societe Metallurgique d'Imphy. This plant comprises a rotary furnace having a horizontal or substantially horizontal axis and heated by a flame burning in the presence of blown-in industrial oxygen, in which the smoke contains zinc vapour when zinc oxide is being reduced. This smoke consists essentially of carbon monoxide, carbon dioxide, hydrogen and water vapour.

The thermal efficiency of such a plant and the temperature of the smoke may be increased by using the process and plant described in the French Patent No. 1,429,310 entitled "Process for the Reduction of Ores which are Difficult to Reduce and Plant for Using this Process" filed on Dec. 2, 1964, by the Societe Metallurgique d'Imphy. In this patent pulverulent particles are delivered to the flame heating the horizontal-axis rotating furnace.

As compared to known processes using air or slightly super-oxygenated air as a burning agent, the use of industrial oxygen for supporting the flame in a rotary furnace and increasing the thermal efficiency, of desired, by blowing solid particles into the flame results in an increase in zinc production per unit weight of fuel used. A very hot smoke of much smaller volume is produced than in known processes.

The invention concerns the treatment of such very hot smoke containing a concentration of zinc vapour, and relates to a plant in which the smoke from the direct reduction of zinc oxide in a rotating furnace heated by a flame burning in the presence of added industrial oxygen is cooled in at least one hood having a substantially vertical axis and cooled walls, water being injected and being recovered together with the solid metallic zinc, at the base of the hood.

The invention also relates to the process of using the very hot smoke from a plant for direct reduction of zinc oxide, containing a concentration of zinc oxide, and steeping the smoke in a rapid-cooling hood.

Such a plant and such a process can be used, because the volume of smoke is less important compared to the quantity of zinc vapour being treated, and a considerable advantage is obtained since in the absence of a smoke-steeper, the zinc would re-oxidise in the presence of carbon dioxide and water vapour, and a largely re-oxidised zinc would be obtained instead of metallic zinc.

The invention will now be described in greater detail with reference to an embodiment which is given by way of example and is illustrated in the drawing.

The single figure is a diagrammatic view of a plant according to the invention.

The drawing illustrates a rotary furnace 1 having a horizontal axis of rotation and containing a bath 2 comprising zinc oxide and a reducer such as carbon. The furnace is heated by a flame 3 fed, for example, by completely or partially decomposed natural gas blown in as shown by the arrow 4, in the presence of industrial oxygen blown in through a pipe 5. This furnace is of the type described in the French Patent No. 1,411,035 filed on Apr. 30, 1964, cited above, and pulverulent particles may be fed to the flame 3 in order to increase its emissive power.

The very hot smoke emerges at 6, entering a refractory conduit 7 and then a vertical-axis cylindrical hood 8 having sheet-metal walls through which a coolant passes in pipes 9.

Inside the hood there are ramps 10 comprising water-atomiser apertures 11 directed towards the bottom of the hood in the same direction of flow as the smoke.

At the bottom of the hood, the excess of unvaporised water and the granulated zinc are recovered in an enclosure 12, and the smoke is aspirated by a fan (not illustrated) in the direction of the arrow 13.

The water is separated from the zinc by a filter 14 and is discharged through a tap 15. The zinc is periodically removed from the enclosure 12 through an inspection door.

The zinc carried by the smoke at 13 is covered on the surface with a layer of oxide and may be recovered by a known purifying device. It may be re-melted and refined by fractional distillation, for example, using a known process.

Example

Direct reduction of zinc oxide was carried out in a horizontal furnace of the type illustrated in the drawing, having an internal diameter of 5 metres and an effective internal length of 7.5 metres. Such a furnace is capable of producing 8 tons of metallic zinc per hour consuming 2.8 tons of coke dust per hour, 1,200 normal cubic metres of natural gas, in practice methane, per hour, and 7 tons of industrial oxygen per hour.

Smoke production approximated 5,600 normal cubic metres per hour, the composition of the smoke by volume being:

| | Percent |
|---|---|
| $CO_2$ | 52 |
| $H_2O$ | 25 |
| $CO$ | 17 |
| $H_2$ | 6 |

This smoke contained 20% zinc vapour.

The smoke first of all passed into a refractory conduit 7 1 metre long and having a cross-section of 1.5 m.². The temperature of the smoke upon emerging from the furnace 1 was 1500° C., and was 1300° C. upon emerging from the refractory zone 7.

The smoke then passed into the vertical hood 8, where it was subjected to water-atomisation through the aperture 11. Water consumption for the whole hood was 18 cubic metres per hour.

The height of the internal vertical part of the hood was 10 metres.

The zinc recovered in the enclosure 12 was non-oxidised metal.

The invention is not limited by the details of this embodiment and of the example above described, and

I claim:
1. A process for obtaining metallic zinc comprising the steps of directly reducing zinc oxide and volatilizing the resulting metallic zinc in a rotary furnace heated to about 1500° C. by a flame produced by burning a gaseous fuel with industrial oxygen, directing the resulting zinc containing gases while they are at a temperature of about 1300° C. into the top of a vertically disposed hood, cooling the hood by cooling the walls thereof, injecting water into said gases to condense the zinc and recovering water and solid metallic zinc at the base of the hood.

2. Process as described in claim 1 including the step of separating the metallic zinc from the water by filtering.

References Cited

UNITED STATES PATENTS

| 2,096,779 | 10/1937 | Bartholomew et al. | 75—88 |
| 2,298,139 | 10/1942 | Long et al. | 75—88 |
| 2,637,649 | 5/1953 | Handwerk et al. | 75—88 |
| 3,314,781 | 4/1967 | Johansson et al. | 75—60 |

FOREIGN PATENTS

| 377,451 | 7/1932 | Great Britain. |
| 1,411,035 | 8/1965 | France. |
| 1,429,310 | 1/1966 | France. |

L. DEWAYNE RUTLEDGE, *Primary Examiner.*

THOMAS D. PENDER, *Assistant Examiner.*